(12) United States Patent
Miyakawa et al.

(10) Patent No.: US 7,811,653 B2
(45) Date of Patent: Oct. 12, 2010

(54) EXTRUSION MOLDED ARTICLE FOR AUTOMOBILES

(75) Inventors: Naohisa Miyakawa, Chiba (JP); Hiromasa Sanada, Tokyo (JP); Naoyuki Ono, Tokyo (JP); Tomozo Ogawa, Mie (JP)

(73) Assignee: Riken Technos Corporation, Tokyo (JP)

( * ) Notice: Subject to any disclaimer, the term of this patent is extended or adjusted under 35 U.S.C. 154(b) by 485 days.

(21) Appl. No.: 11/730,850

(22) Filed: Apr. 4, 2007

(65) Prior Publication Data
US 2007/0237922 A1      Oct. 11, 2007

(30) Foreign Application Priority Data
Apr. 5, 2006 (JP) .............................. 2006-104687

(51) Int. Cl.
E06B 7/16      (2006.01)
B32B 3/04      (2006.01)

(52) U.S. Cl. .................. 428/122; 428/68; 428/119; 428/120; 428/188; 428/212; 49/440; 49/441; 49/483.1; 49/490.1; 49/498.1

(58) Field of Classification Search ................ None
See application file for complete search history.

(56) References Cited

U.S. PATENT DOCUMENTS

| | | | | |
|---|---|---|---|---|
| 4,308,302 | A | * | 12/1981 | Etter et al. .................... 428/83 |
| 5,216,074 | A | * | 6/1993 | Imai et al. .................... 525/66 |
| 6,132,847 | A | * | 10/2000 | Okita et al. ................. 428/159 |
| 6,329,439 | B1 | * | 12/2001 | Peterson et al. ............... 521/51 |
| 6,571,514 | B1 | * | 6/2003 | Aritake ...................... 49/490.1 |
| 6,706,385 | B1 | * | 3/2004 | Karaiwa ...................... 428/323 |

(Continued)

FOREIGN PATENT DOCUMENTS

EP      1 197 519 A1      4/2002

(Continued)

OTHER PUBLICATIONS

English Abstract of JP 2005-36170 A, Feb. 10, 2005.*

*Primary Examiner*—David R Sample
*Assistant Examiner*—Jeff A Vonch
(74) *Attorney, Agent, or Firm*—Oliff & Berridge, PLC

(57) ABSTRACT

An extrusion molded article for automobiles, having a body portion (1) and a hollow sealing portion (11), where the body portion (1) comprises a core (2) made of a resin having a U-shaped cross-section extending in a longitudinal direction and a covering layer (3) surrounding and covering the core partly or entirely, and the hollow sealing portion (11) is bonded integrally with an outer surface (4) of the body portion, characterized in that the covering layer (3) is made of a thermoplastic elastomer composition having a tensile elongation at break of at least 350%, as determined according to JIS K6251, and a change in 100% modulus of at most 40%, wherein the change in 100% modulus=[(100% modulus at 23° C.-100% modulus at 80° C.)/100% modulus at 23° C.]×100, and the 100% modulus is a stress at 100% elongation, as determined according to JIS K6251, and the hollow sealing portion (11) is made of a thermoplastic elastomer composition having a tensile elongation at break of at least 250%, as determined according to JIS K6251, and a compression set of 35% or less, as determined at 25% compression, 70° C., 200 hours.

6 Claims, 5 Drawing Sheets

U.S. PATENT DOCUMENTS

| | | | |
|---|---|---|---|
| 2001/0047055 A1* | 11/2001 | Takeuchi et al. | 525/88 |
| 2005/0072052 A1 | 4/2005 | Kounobu et al. | |
| 2005/0101737 A1* | 5/2005 | Pazur et al. | 525/192 |
| 2005/0233110 A1* | 10/2005 | Miyakawa et al. | 428/122 |
| 2006/0066060 A1* | 3/2006 | Reineke | 277/628 |

FOREIGN PATENT DOCUMENTS

| | | |
|---|---|---|
| FR | 2 161 716 | 7/1973 |
| GB | 2 413 144 A | 10/2005 |
| JP | 2005036170 A * | 2/2005 |
| JP | A-2005-132343 | 5/2005 |
| JP | A-2005-306344 | 11/2005 |

* cited by examiner

EXTRUSION MOLDED ARTICLE FOR AUTOMOBILES

TECHNICAL FIELD

The present invention relates to an extrusion molded article such as weather strips and opening trims that are used at various opening portions such as doors and trunks in automobiles.

BACKGROUND OF THE INVENTION

Weather strips and opening trims for automobiles are long stripe-shaped interior parts having sealing ability that are provided in outer frames at doors and bodies in order to keep out rainwater and external atmosphere and to shut out noises.

The aforementioned interior part comprises a body portion (1) having a core (2) with a U-shaped cross-section and surrounding covering layer (3), and a hollow sealing portion (11) formed integrally with the body portion (1).

For this interior part, a metallic core was conventionally used in order to increase fit-holding force with the car body panel. However, recently, from the aspect of productivity and reduction of weight, resin products instead of metals were used as a core, as described in Japanese Patent Application Laid-Open No. 2005-132343. When a metallic core is used, a covering layer is formed by extrusion molding around the plate-shaped core and then the core is bent to form a U-shaped cross-section. Meanwhile, when the core is made of a resin, a U-shaped core can be formed by extrusion molding and a covering layer is subsequently formed by extrusion so that a bending process is not needed, as described in Japanese Patent Application Laid-Open No. 2005-306344.

On the other hand, the covering layer and the hollow sealing portion are generally made of rubbers, as described in Japanese Patent Application Laid-Open No. 2005-132343. Rubber products require a vulcanization process after molded. Since the covering layer and the hollow sealing portion have different functions, the required physical properties are different. In particular, the hollow sealing portion works as cushion, softer rubber than those used for the covering layer is generally used. A softening agent such as oil is added in order to impart pliability to the rubber. However, when a softening agent is used, bleeding may occur which results in deterioration of the appearance. Therefore, a foamed vulcanized rubber is generally used for the hollow sealing portion. It is difficult to form and adhere a non-foamed body portion and a foamed hollow sealing portion together in a single process. Conventionally, a process for forming a body portion by extrusion molding a covering layer over the core and a process of forming a hollow sealing portion by extrusion molding were separately performed, and then the body portion and the hollow sealing portion were bonded together.

Because of the recent increasing concern in environmental issues, there has been a demand to use recyclable thermoplastic elastomers for the rubber covering layer and hollow sealing portions.

DISCLOSURE OF THE INVENTION

Problems to be Solved by the Invention

An object of the present invention is to provide an extrusion molded article for automobiles, comprising a body portion (1) having a core (2) and a covering layer (3) surrounding the core and a hollow sealing portion (11) which is integrally bonded to the body portion (1), the article having excellent appearance and performance, wherein extrusion molding of the covering layer and extrusion molding of the hollow sealing portion can be carried out simultaneously with a single die, that is, the article can be formed monolithically by co-extrusion.

Means to Solve the Problems

The inventors have discovered that the aforementioned object can be attained by using specific thermoplastic elastomer compositions each in the coveting layer (3) and in the hollow sealing portion (11).

That is, the present invention provides an extrusion molded article for automobiles, having a body portion (1) and a hollow sealing portion (11), where the body portion (1) comprises a core (2) made of a resin having a U-shaped cross-section extending in a longitudinal direction and a covering layer (3) surrounding and covering the core partly or entirely, and the hollow sealing portion (11) is bonded integrally with an outer surface (4) of the body portion, characterized in that the covering layer (3) is made of a thermoplastic elastomer composition having a tensile elongation at break of at least 350%, as determined according to the Japanese Industrial Standards (JIS) K6251, and a change in 100% modulus of at most 40%, wherein the change in 100% modulus=[(100% modulus at 23° C.-100% modulus at 80° C.)/100% modulus at 23° C.]×100, and the 100% modulus is a stress at 100% elongation, as determined according to JIS K6251, and the hollow sealing portion (11) is made of a thermoplastic elastomer composition having a tensile elongation at break of at least 250%, as determined according to JIS K6251, and a compression set of 35% or less, as determined at 25% compression, 70° C., 200 hours.

According to a preferred embodiment of the present invention, the aforementioned molded article has a push-in portion (6) that is formed extending from a portion of the covering layer to one side of an inner surface (5) of the body portion, wherein the push-in portion (6) extends in an outward direction from an opening portion (7), formed by the inner surface (5) of the body portion, beyond an end portion (8) of the core (2) so that the push-in portion (6) can be pushed into the opening portion (7), and wherein the push-in portion (6) also has at least one holding skirt (9) extending from a part of the push-in portion.

According to another preferred embodiment of the present invention, the aforementioned molded article has at least one holding skirt (9) extending from a part of the covering layer at a side that is opposite to the side where the push-in portion is formed on the inner surface (5) of the body portion.

According to another preferred embodiment of the present invention, the aforementioned molded article has a thermoplastic resin composition layer having a sliding function, on a part or the whole of the outer surface of the body portion (1) and of the hollow sealing portion (11) and also preferably the thermoplastic resin composition having a sliding function has a tensile elongation at break of 300% or greater (JIS K6251).

According to another preferred embodiment of the present invention, the core (2) is made of a resin composition having a tensile elongation at break of 80% or greater (JIS K7161) and a elastic modulus at 23 C of 2500 MPA or greater (ASTM D790).

Effects of the Invention

According to the present invention, both of the covering layer (3) of the body portion (1) and the hollow sealing portion (11) are made of the thermoplastic elastomer compositions, so that they can be integrally formed by co-extrusion. Therefore, extrusion molded articles such as weather strips and opening trims for automobiles can be manufactured easily. Further, the obtained molded article have sufficient pliability (R tracking ability) such that it can be bent along a corner portion of a flange when being provided on an auto body and also has sufficient sealing ability and excellent appearance. Moreover, since both the covering layer (3) and the hollow sealing portion (11) are made of thermoplastic elastomer compositions, they can be recycled. In addition, the core is made of a resin, so that its weight is smaller and the recycling processes can be simplified.

PREFERRED EMBODIMENTS TO WORKING THE INVENTION

An example of the extrusion molded article of the present invention is shown in FIG. 2.

FIG. 10 shows a perspective view of another example of the extrusion molded article of the present invention. The extrusion molded article has a body portion (1) and a hollow sealing portion (11), where the body portion (1) comprises a core (2) having a U-shaped cross-section extending in a longitudinal direction and a covering layer (3) surrounding and covering the core partly or entirely, and the hollow sealing portion (11) is bonded integrally with an outer surface (4) of the body portion. FIG. 10 shows a perspective view of an example of the extrusion molded article of the present invention.

In the extrusion molded article of the present invention, the covering layer (3) and the hollow sealing portion (11) are made of thermoplastic elastomer compositions having the following physical properties.

That is, the covering layer (3) is made of a thermoplastic elastomer composition having a tensile elongation at break of at least 350%, preferably at least 500%, as determined according to the Japanese Industrial Standards (JIS) K6251), and a change in 100% modulus of at most 40%, preferably at most 30%, wherein the change in 100% modulus=[(100% modulus at 23° C.-100% modulus at 80° C.)/100% modulus at 23° C.]× 100, the 100% modulus is a stress at 100% elongation, as determined according to JIS K6251. If the tensile elongation at break is less than 350%, tear fractures of the covering material occur easily during R-tracking. If the aforementioned change in 100% modulus exceeds 40%, falling-off from a flange tends to occur easily at a high temperature (80° C. or higher).

Also, the hollow sealing portion (11) is made of a thermoplastic elastomer composition having a tensile elongation at break of at least 250%, preferably at least 350%, as determined according to JIS K6251, and a compression set of at most 35%, preferably at most 25%, as determined at 25% compression, 70° C., 200 hours. If the aforementioned tensile elongation at break is less than 250%, tear fractures of the hollow sealing portion occur easily during R-tracking, If the aforementioned compression set exceeds 35%, the sealing ability with a door is insufficient so that noises in driving and penetration of rain water tend to occur easily. The upper limit for the aforementioned tensile elongation at break is preferably 1000%.

Preferably, the thermoplastic elastomer composition forming the covering layer (3) comprises 100 parts by weight of a composition comprising
(a) 30 to 85 wt % of rubber, and
(b) 15 to 70 wt % of at least one polymer selected from the group consisting of copolymers of an aromatic vinyl compound with conjugated diene, hydrogenated products thereof and hydrogenated products of conjugated diene polymers, and 20 to 63 parts by weight of (c) a crystalline olefin resin, excluding copolymers of ethylene with unsaturated carboxylic acid ester or vinyl acetate), 80 to 210 parts by weight of (d) a non-aromatic softening agent for rubber, and 2 to 12 parts by weight of (e) at least one compound selected from the group consisting of phenol resins and brominated phenol resins.

Also, the thermoplastic elastomer composition for the hollow sealing part (11) preferably comprises 100 parts by weight of a composition comprising
(a) 30 to 85 wt % of rubber, and
(b) 15 to 70 wt % of at least one polymer selected from the group consisting of copolymers of an aromatic vinyl compound with conjugated diene, hydrogenated products thereof and hydrogenated products of conjugated diene polymers, and 4 to 22 parts by weight of (c) a crystalline olefin resin, excluding copolymers of ethylene with unsaturated carboxylic acid ester or vinyl acetate), 100 to 220 parts by weight of (d) a non-aromatic softening agent for rubber, and 2 to 12 parts by weight of (e) at least one compound selected from the group consisting of phenol resins and brominated phenol resins.

The thermoplastic elastomer compositions forming the covering layer (3) and/or the thermoplastic elastomer composition forming the hollow sealing portion (11) may further contain, if desired, 2.3 to 9.0 parts by weight of (f) a cross-linking promoter such as zinc oxide, magnesium oxide, and tin dichloride.

Components (a) through (f) in the thermoplastic elastomer composition forming the covering layer (3) will be explained below.

Component (a):

Component (a) is rubber. This is not particularly restricted, but may be ethylene copolymer rubber (EPDM and the like), butadiene rubber (BR), butyl rubber (IIR), and nitrile rubber (NB). In particular, ethylene copolymer rubber (EPDM and the like) is most preferred.

The aforementioned ethylenic copolymer rubber may be, for instance, copolymers of ethylene with α-olefin such as propylene, 1-butene, and 1-pentene, and copolymers thereof with non-conjugated polyene.

The aforementioned non-conjugated polyenenes may be non-conjugated dienes such as, for instance, 5-ethylidene-2-norbornene (ENB), 1,4-hexadiene, 5-methylene-2-norbornene (MNB), 1,6-octadiene, 5-methyl-1,4-hexadiene, 3,7-dimethyl-1,6-octadiene, 1,3-cyclopentadiene, 1,4-cyclohexadiene, tetrahydroindene, methyltetrahydroindene, dicyclopentadiene, 5-isopropylidene-2-norbornene, 5-vinyl-norbornene, 5-vinylnorbornene, dicyclooctadiene, and methylenenorbornene.

Specific examples of the ethylenic copolymer rubber include ethylene-propylene copolymer rubber, ethylene-propylene non-conjugated diene copolymer rubber, ethylene-1-butene copolymer rubber, ethylene-1-butene non-conjugated diene copolymer rubber, and ethylene-propylene-1-butene copolymer rubber. From the aspect of the cross-linking ability of the phenol resin, ethylene-propylene-non-conjugated diene copolymer rubber (EPDM) is most preferred.

Component (b) is at least one polymer selected from the group consisting of copolymers of an aromatic vinyl compound with conjugated diene (b-1) and their hydrogenated derivatives (b-2), and hydrogenated derivatives of conjugated diene polymers (b-3).

The copolymers (b-1) include random copolymers of aromatic vinyl compound and conjugated diene (b-1-1) and block copolymers of aromatic vinyl compounds and conjugated diene (b-1-2). The aromatic vinyl compound constituting these copolymers may be one or more selected from styrene, t-butylstyrene, α-methylstyrene, p-methylstyrene, divinylbenzene, 1,1-diphenylstyrene, N,N-diethyl-p-aminoethylstyrene, vinyl toluene, and p-tert-butylstyrene. In particular, styrene is preferred. The conjugated diene may be, for instance, one or more selected from butadiene, isoprene, 1,3-pentadiene, 2,3-dimethyl-1, and 3-butadiene In particular, butadiene, isoprene, and a combination of these are preferred.

The aforementioned random copolymer (b-1-1) comprises an aromatic vinyl compound in an amount of 3 to 60 percent by weight, preferably 5 to 50 percent by weight. The number average molecular weight ranges preferably from 150,000 to 500,000, more preferably from 170,000 to 400,000, and most preferably from 200,000 to 350,000. The molecular weight distribution is 10 or less.

Specific examples of the aforementioned random copolymer (b-1-1) are copolymers of styrene and butadiene (SBR).

The aforementioned block copolymer (b-1-2) comprises at least two polymer blocks A consisting primarily of an aromatic vinyl compound and at least one of polymer block B consisting primarily of a conjugated diene, such as, for instance, aromatic vinyl compound-conjugated diene block copolymers have the structures: A-B-A, B-A-B-A, or A-B-A-B-A. The aforementioned block copolymer comprises an aromatic vinyl compound in an amount of 5 to 60 percent by weight, preferably 20 to 50 percent by weight.

Preferably, the polymer block A consisting primarily of an aromatic vinyl compound is composed solely of an aromatic vinyl compound, or is a copolymer bock comprising at least 50 percent by weight, preferably at least 70 percent by weight of an aromatic vinyl compound with a conjugated diene.

The polymer block B consisting primarily of conjugated diene preferably comprises a conjugated diene alone, or is a copolymer bock comprising at least 50 percent by weight, preferably at least 70 percent by weight, of a conjugated diene with an aromatic vinyl compound.

The number average molecular weight of the aforementioned block copolymers (b-1-2) preferably ranges from 5,000 to 1,500,000, more preferably from 10,000 to 550,000, and further more preferably from 100,000 to 400,000. The molecular weight distribution is 10 or less. The molecular structure of the block copolymer may be linear, branched or helical or any combinations of these.

In the polymer block A consisting primarily of an aromatic vinyl compound and in the polymer block B consisting primarily of the conjugated diene, the distribution manner of the units derived from the conjugated diene or aromatic vinyl compound in the molecular chain can be random, tapered (that is, the amount of the monomer component increases or decreases along the molecular chain), partially blocked or any combinations of these. If two or more polymer blocks A consisting primarily of an aromatic vinyl compound are present or if two or more polymer blocks B consisting primarily of conjugated diene are present, the polymer blocks may have the same structure or different structures.

Specific examples of the aforementioned block copolymer (b-1-2) include styrene-butadiene-styrene copolymers (SBS), and styrene-isoprene-styrene copolymers (SIS).

Many methods have been proposed as to produce the aforementioned block copolymers (b-1-2). According to the typical method as disclosed in Japanese Patent Publication No. Sho-40-23798/1965, block polymerization is carried out in an inert solvent, using a lithium catalyst or a Ziegler catalyst.

The aforementioned hydrogenated derivative (b-2) includes hydrogenated derivatives (b-2-1) of the aforementioned random copolymers (b-1-1) and hydrogenated derivatives (P-2-2) of the aforementioned block copolymers (b-1-2).

The hydrogenated derivative (b-2-1) is hydrogenated random copolymers obtained by hydrogenating the aforementioned random copolymers (b-1-1).

The hydrogenated derivative (b-2-1) preferably has a melt mass flow rate of 12 g/10 min. or less, more preferably 6 g/10 min. or less, as determined according to ASTM D 1238 at 230° C. with a load of 21.18N, from the aspect of tensile properties and heat deformation resistance.

The content of the aromatic vinyl compound in the hydrogenated derivatives (b-2-1) is preferably 25 percent by weight or less, more preferably 20 percent by weight or less, for the purpose of obtaining a soft thermoplastic elastomer compound. For the same purpose, preferably at least 90%, more preferably 100%, of the carbon-carbon double bonds of the conjugated diene are hydrogenated.

As the hydrogenated derivative (b-2-1), Dinalon 1320P (JSR Corporation) may be mentioned, for instance.

The hydrogenated derivative (b-2-2) is a hydrogenated block copolymer obtained by hydrogenating the aforementioned block copolymer (b-1-2).

The degree of hydrogenation in the hydrogenated derivative (b-2-2) can be arbitrary. Preferably, the degree of hydrogenation is 50% or greater, more preferably 55% or greater, further preferably 60% or greater in the polymer block B consisting primarily of a conjugated diene. Its microstructure is arbitrary. For instance, in a case where the block B is constituted of butadiene alone, the ratio of the 1,2-microstructure in the polybutadiene block preferably ranges from 20 to 50 percent by weight, more preferably from 25 to 45 percent by weight. The 1,2-bonds may be selectively hydrogenated. In a case where the block B is constituted of a mixture of isoprene and butadiene, the ratio of the 1,2-microstructure is preferably less than 50%, more preferably less than 25% and most preferably less than 15%.

Preferably, if the block B is constituted of isoprene only, 70 to 100 percent by weight of the isoprene in the polyisoprene block has the 1,4-microstructure and at least 90% of the aliphatic double bonds derived from isoprene is hydrogenated.

It is preferred that, the polymer block A accounts for 5 to 70% by weight of the entire components in the hydrogenated derivative (b-2-2). The whole weight average molecular weight of the hydrogenated derivative (b-2-2) is preferably 150,000 to 500,000, more preferably 200,000 to 400,000. If the weight average molecular weight is less than 200,000, oil bleeding occurs.

Specific examples of the hydrogenated derivative (b-2-2) include styrene-ethylene-butene copolymers (SEB), styrene-ethylene-propylene copolymers (SEP), styrene-ethylene-butene-styrene copolymers (SEBS), styrene-ethylene-propylene-styrene copolymers (SEPS), styrene-ethylene-ethylene-propylene-styrene copolymers (SEEPS), and styrene-butadiene-butylene-styrene copolymers (partially hydrogenated styrene-butadiene-styrene copolymers, SBBS). Among them, styrene-ethylene-ethylene-propylene-styrene copolymers (SEEPS) are most preferred from the aspect of an excellent effect of imparting softness and reduced oil bleeding.

The hydrogenated derivative (b-2-2) can be produced by applying an hydrogenation treatment for the aforementioned block copolymer (b-1-2). The hydrogenation treatment can be carried out by a known method, For instance, in the presence of a hydrogenation catalyst in an inert solvent.

The hydrogenated derivative (b-3) is a hydrogenated derivative of a conjugated diene polymer. For instance, this may be a block copolymer having a crystalline ethylene block and an amorphous ethylene block (CEBC) obtained by hydrogenating the butadiene polymer. Hydrogenated derivative (b-3) can be used alone or as a mixture of two or more of such.

The weight average molecular weight of the hydrogenated derivative (b-3) is preferably 500,000 or less, more preferably from 200,000 to 450,000. If the weight average molecular weight exceeds 500,000, extrusion and injection molding properties of a resultant thermoplastic elastomer composition are worse. In contrast, if it is less than 200,000, oil bleeding occurs and the compression set of a resultant thermoplastic elastomer composition is worse.

Among the aforementioned polymers, the hydrogenated derivative (b-2-2), in particular, styrene-ethylene-ethylene-propylene-styrene copolymers (SEEPS), is preferred from the aspect of an excellent effect of imparting softness and minimum oil bleeding. In particular, Septon 4077 and 4055 (ex Kurare Corp.) are most preferred because of its molecular weight.

A ratio of component (a) to component (b), (a)/(b), is preferably 30-85 percent by weight/15-70 percent by weight, and more preferably 40-80 percent by weight/20-60 percent by weight. If the ratio of component (b) exceeds the aforementioned upper limit, the reaction force at a high temperature is insufficient and the flange-holding force is insufficient. If the ratio of component (b) is less than the aforementioned lower limit, the tensile elongation at break of the thermoplastic elastomer compositions is too low and the R-tracking ability is insufficient.

Component (c):

Component (c) is a crystalline olefin resin, such as homopolymers of olefins such as ethylene, propylene, butene-1, and 4-methylpentene-1, and copolymers consisting primarily of these olefins. However, a copolymer of ethylene with unsaturated carboxylic acid ester or vinyl acetate have problems that it shows high tackiness upon melting and strong adhesion to a metal (blender) due to its polarity, tends to yellow and has bad odor, which is undesirable. Therefore, component (c), crystalline olefin resin, is not a copolymer of ethylene with unsaturated carboxylic acid ester or vinyl acetate.

Examples of component (c) include homopolymers of ethylene or propylene, and crystalline copolymers consisting primarily of ethylene or propylene. More specifically, crystalline ethylene polymers such as high density polyethylene, low density polyethylene, and ethylene/α-olefin copolymers, propylene homopolymers and crystalline propylene copolymers such as propylene-α-olefin copolymers may be named. Here, examples of α-olefins that are used in the copolymers of ethylene or propylene include α-olefins with 2 to 10 carbon atoms such as ethylene, propylene, butene-1, hexene-1,4-methylpentene-1,3-methylpentene-1, octene-1 and the like. The crystalline copolymers consisting primarily of ethylene or propylene include crystalline ethylene polymers such as ethylene-butene-1 copolymers, ethylene-hexene-1 copolymers, and ethylene-octene-1 copolymers, and crystalline propylene polymers such as propylene-ethylene random copolymers, ptopylene-ethylene block copolymers, propylene-ethylene random block copolymers, propylene-butene-1 copolymers, propylene-ethylene-butene-1 terpolymers.

A catalyst that may be used in synthesizing component (b) includes Ziegler-Natta catalysts and metallocene catalysts.

From the standpoint of compatibility of component (a) with component (b), ethylene resins synthesized with a metallocene catalyst are preferred as component (c). Polypropylene is also preferred as component (c).

The melting point of component (c), as determined by DSC, is preferably from 30 to 180° C., more preferably from 40 to 170° C. Here, the melting point by DSC is a peak top melting point presented by a differential scanning colorimeter (DSC). Specifically, a sample of 10 mg is taken up, kept at a temperature of 190° C. for 5 min., crystallized by lowering the temperature to −10° C. at a descending temperature rate of 10° C. per min., kept the temperature at −10° C. for 5 min., and then heated up to 200° C. at a rate of 10° C. per minute.

The amount of component (c) to be added is 20 to 63 parts by weight, preferably 30 to 55 parts by weight, relative to 100 parts by weight of a total of component (a) and component (b). If it exceeds the aforementioned upper limit, the R-tracking ability is insufficient. If it is less than the aforementioned lower limit, the poor flowability causes poor appearance and insufficient tensile strength, which occur tearing fracture in R-tacking operation.

Component (d):

Component (d) is a non-aromatic softening agent for rubber. Preferably, paraffin oils are used. For instance, paraffin compounds having 4 to 155 carbon atoms, preferably paraffin compounds having 4 to 50 carbon atoms, are used. More specifically, the following paraffin compounds can be used: n-paraffins (linear saturated hydrocarbons) such as butane, pentane, hexane, heptane, octane, nonane, decane, undecane, dodecane, tetradecane, pentadecane, hexadecane, heptadecane, ocadecane, nonadecane, eicosane, heneicosane, docosane, tricosane, tetracosane, pentacosane, hexacosane, heptacosane, octacosane, nonacosane, triacontane, hentriacontane, dotriacontane, pentatriacontane, hexacontane, and heptacontane, isoparaffins (branched saturated hydrocarbons) such as isobutene, isopentane, neopentane, isohexane, isopentane, neohexane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, 3-methylheptane, 2,2-dimethylhexane, 2,3-dimethylhexane, 2,4-dimethylhexane, 2,5-dimethylhexane, 3,4-dimethylhexane, 2,2,3-trimethylpentane, isooctane, 2,3,4-trimethylpentane, isononane, 2-methylnonane, isodecane, isoundecane, isododecane, isotridecane, isotetradecane, isopentadecane, isooctadecane, isonanodecane, isoeicosane, and 4-ethyl-5-methyloctane; and derivatives of these saturated hydrocarbons. These paraffin oils are preferably in a liquid form at room temperature. A mixture of two or more of these can be used.

Commercially available paraffin oils that are in a liquid form at room temperature include NA solvent (isoparaffin hydrocarbons), ex Nippon Oils and Fats Corporation, PW-90 and PW-380 (n-paraffin type process oils), ex Idemitsu Kosan Co., Ltd., IP-Solvent 2835 (synthetic isoparaffin hydrocarbon, isoparaffin content of 99.8% or higher)),ex Idemitsu Petrochemical Co., Ltd., Neothiozol (n-paraffin process oils), ex Sanko Chemical Co., Ltd.

The paraffin oils may contain a small quantity of unsaturated hydrocarbons and their derivatives. Examples of the unsaturated hydrocarbons are ethylenic hydrocarbons such as ethylene, propylene, 1-butene, 2-butene, isobutylene, 1-pentene, 3-methyl-1-butene, 3-methyl-1-butene, 2-methyl-2-butene, 1-hexene, 2,3-dimethyl-2-butene, 1-heptene, 1-octene, 1-nonene and 1-decene; and acetylenic hydrocarbons such as acetylene, methylacetylene, 1-butyn, 1-pentyn, 1-hexyn, 1-octyn, 1-nonyn and 1-decyn.

Component (d) preferably has a dynamic viscosity at 37.8° C. of from 20 to 500 cSt; a flow point of from −10 to −15° C.; and a flashpoint (COC) of from 170 to 300° C.

The amount of component (d) is preferably 80 to 210 parts by weight, more preferably 100 to 190 parts by weight, further preferably 120 to 180 parts by weight, relative to 100 parts by weight of a total of component (a) and component (b). If it exceeds the aforementioned upper limit, oil bleeding is conspicuous. If it is less than the aforementioned lower limit, appearance of a molded product and R-tracking ability are insufficient.

Component (e):

Component (e) is at least one compound selected from the group consisting of phenol resins and brominated phenol resins. Any phenol resins and brominated phenol resins that can cross-link rubber can be used as Component (e).

Preferably, Component (e) is a phenol resin having the general formula (I):

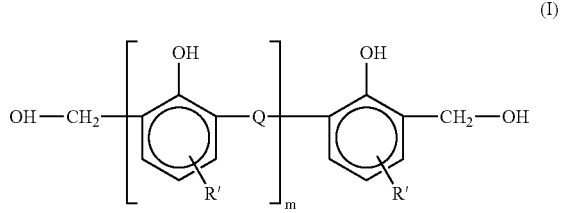

wherein Q is a divalent group selected from the group consisting of —CH$_2$— and —CH$_2$—O—CH$_2$—, m is 0 or a positive integer of from 1 to 20, and R' is an organic group, and a brominated phenol resin in which the hydroxyl group (preferably terminal hydroxyl group) is substituted with a bromine atom. Preferably, Q is a divalent —CH$_2$—O—CH$_2$— and m is 0 or a positive integer of 1 to 10, and R' is an organic group having less than 20 carbon atoms. More preferably, m is 0 or a positive integer of 1 to 5, and R' is an organic group having 4 to 12 carbon atoms.

Among the aforementioned phenol resins, alkylphenol formaldehyde resins, methylolated alkylphenol resins, brominated alkylphenol resins are more preferred, and in particular, alkylphenol formaldehyde resins are most preferred.

The aforementioned phenol resins can be manufactured in any conventional methods. For instance, an alkyl-substituted phenol or unsubstituted phenol is condensed with aldehyde, preferably formaldehyde in an alkali medium, or bifunctional phenol dialcohol is condensed. Alternatively, commercial phenol resins can be used.

Examples of commercial products for the aforementioned phenol resin are Tackirol 201 (alkylphenol formaldehyde resin, ex Taoka Chemical Co., Ltd.), Tackirol 250-I (brominated alkylphenol formaldehyde resin with a bromination ratio of 4%, ex Taoka Chemical Co., Ltd.), Tackirol 250-III (brominated alkylphenol formaldehyde resin, ex Taoka Chemical Co., Ltd.), PR-4507 (ex Gun Ei Chemical Industry Co., Ltd.), Vulkaresat 510E (ex Hoechst Corp.), Vulkaresat 532E (ex Hoechst Corp.), Vulkaresen E (ex Hoechst Corp.), Vulkaresen 105E (ex Hoechst Corp.), Vulkaresen 130E (Hoechst Corp.), Vulkaresol 315E (Hoechst Corp.), Amberol ST 137X (ex Rohm & Haas Co., Ltd.), Sumilite Resin PR-22193 (ex Sumitomo Dules Co., Ltd.), Symphorm-C-100 (ex Anchor Chem. Co., Ltd.), Symphorm-C-1001 (ex Anchor Chem., Co., Ltd.), Tamanor 531 (ex Arakawa Chemical Co., Ltd.), Schenectady SP1059 (ex Schenectady Chem. Corp.), Schenectady SP1045 (ex Schenectady Chem. Corp.), CRR-0803 (ex U.C.C. Corp.), Schenectady SP1055 (ex Schenectady Chem., Corp.), Schenectady SP1056 (ex Schenectady Chem. Corp.), CRM-0803 (ex Showa Union Synthesis Co., Ltd.), and Vulkadur A (ex Bayer Corp.). In particular, Tackirol 201 (alkylphenol formaldehyde resin) is most preferred.

The amount of component (e) to be added is 2 to 12 parts by weight, preferably 3 to 11 parts by weight, relative to 100 parts by weight of a total of component (a) and component (b). If it exceeds the aforementioned upper limit, tensile elongation at break of the thermoplastic elastomer composition is too low and the R-tracking ability is insufficient. If it is less than the aforementioned lower limit, the reaction force is insufficient so that the flange-holding is insufficient.

Component (f) (Optional Component):

Component (f) is a cross-linking promoter and is used as an optional component for further improving the function of component (e) as a cross-linking agent, and for improving compression set and heat resistance. Examples of component (f) include zinc oxide, magnesium oxide and stannic dichloride. When zinc oxide is used as component (f), stearic acid metal salts and the like can be used together as a dispersant. Among the aforementioned cross-linking promoters, zinc oxide is most preferred.

Component (f) is added in an amount of 0.01 to 5 parts by weight, preferably 0.1 to 1 part by weight, relative to 100 parts by weight of a total of component (a) and component (b). If the amount of component (f) exceeds the aforementioned upper limit, the flowability is poor, so that the appearance is bad, and the R-tracking ability is insufficient.

Next, components (a) through (f) in the thermoplastic elastomer composition for forming the hollow sealing part (11) will be explained below.

Components (a) though (f) can be the same as components (a) though (f) in the thermoplastic elastomer composition for forming the covering layer (3).

The ratio of component (a) to component (b), (a)/(b), ranges from 30-85 percent by weight/15 to 70 percent by weight, preferably 40-80 percent by weight/20-60 percent by weight. If the ratio of component (b) exceeds the aforementioned upper limit, the sealing performance is insufficient due to worse compression set. If the ratio of component (b) is less than the aforementioned lower limit, the tensile elongation at break of thermoplastic elastomer composition is worse so that the R-tracking ability is insufficient.

The amount of component (c) to be added ranges from 4 to 22 parts by weight, preferably from 5 to 21 parts by weight, relative to 100 parts by weight of a total of component (a) and component (b). If it exceeds the aforementioned upper limit, the compression set is impaired so that the sealing performance is insufficient. If it is less than the aforementioned lower limit, the appearance is bad due to bad flowability, and tearing fracture occurs in R-tracking operation due to the insufficient tensile elongation.

The amount of component (d) to be added ranges from 100 to 220 parts by weight, preferably from 140 to 200 parts by weight, relative to 100 parts by weight of a total of component (a) and component (b). If it exceeds the aforementioned upper limit, the oil bleeding is conspicuous. If it is less than the aforementioned lower limit, the appearance of a molded article and the R-tracking ability are insufficient.

The amount of component (e) to be added ranges from 2 to 12 parts by weight, preferably from 3 to 11 parts by weight, relative to 100 parts by weight of a total of component (a) and component (b). If it exceeds the aforementioned upper limit, the tensile elongation at break of the thermoplastic elastomer composition is smaller so that the R-tracking ability is insufficient. If it is less than the aforementioned lower limit, the sealing performance is insufficient due to the worse compression set.

The amount of component (f) to be added ranges from 0.01 to 5 parts by weight, preferably from 0.1 to 1 part by weight, relative 100 parts by weight of a total of component (a) and component (b). If the amount of component (f) added exceeds the aforementioned upper limit, the appearance is worse due to the insufficient flowability and the R-tracking ability is insufficient, too.

Other components:

The thermoplastic elastomer compositions for the covering layer (3) and the hollow sealing portion (11) may contain various additives s long as the object of the present invention is not interfered with. These additives include heat stabilizers, antioxidants, photo stabilizers, UV-ray absorbents, nucleating agents, anti-blocking agents, sealing ability improving agents, stearic acid, mold-releasing agents such as silicone oil and the like, lubricants such as ethylene wax and the like, colorants, pigments, inorganic fillers (alumina, talc, calcium carbonate, mica, Wollastonite, clay), foaming agents (organic or inorganic), flame retardants (metal hydrates, red phosphorus, ammonium polyphosphate, antimony, silicone).

The antioxidant includes phenolic antioxidants such as 2,6-di-tert-p-butyl-p-cresol, 2,6-di-tert-butylphenol, 2,4-dimethyl-6-tert-butylphenol, 4,4,-dihydroxydiphenyl, and tris (2-methyl-4-hydroxy-5-tert-butylphenyl)butane, phosphite antioxidants, thioether antioxidants. In particular, the phenolic antioxidants and the phosphite antioxidants are particularly preferred.

The foaming agents preferably include Expancell (ex Expancel Corporation) and Matsumoto Microsphere (ex Matsumoto Yushi-Seiyaku Co., Ltd.).

The thermoplastic elastomer composition for the covering layer (3) comprises the aforementioned components (a) through (e) and, if desired, component (f) and other components, and preferably has hardness A of from 40 to 70, more preferably, from 45 to 55. The hardness as mentioned in this specification is a value after 15 seconds, as determined in accordance with JIS K6253. If the hardness A exceeds the aforementioned upper limit, the R-tracking ability is insufficient. If it is less than the lower limit, the reaction force is insufficient so that the flange-holding force is insufficient.

The thermoplastic elastomer composition for the sealing portion comprises the aforementioned components (a) through (e) and, if desired, component (f) and other components, and preferably has hardness A of from 10 to 35, more preferably, from 15 to 30. If the hardness A exceeds the aforementioned upper limit, the reaction force is too high, so that the sealing performance is insufficient. If it is less than the aforementioned lower limit, the reaction force is too low, so that the sealing performance is insufficient.

The core (2) is made of a resin and has a U-shaped cross-section, FIG. 3 is a perspective view of an example of the core (2). Specific examples of the resin include synthetic resins such as olefin resins such as polypropylene and polyethylene, and styrene resins, or a mixture of these synthetic resins with powder such as talc, mica or glass fiber. These are preferred from the standpoint of heat fusibility with the covering material and the hollow sealing material. The aforementioned synthetic resins preferably have a tensile elongation at break (JIS K7161) of 80% or greater, preferably ranging from 80% to 200%, and an elastic modulus at 23° C. (ASTM D790) of 2500 MPa or greater, preferably from 3500 MPa to 6000 MPa. If the tensile elongation at break is less than 80%, the R-tracking ability is insufficient. If the elastic modulus is less than 2500 MPa, the holding force of the flange portion is insufficient.

The core (2) may have a cut portion of a variety of shapes, if desired. For example, as shown in FIG. 4, it may extend in the longitudinal direction and may be in a comb shape formed by punching out a portion of the side of the core having a U-shaped cross-section using a punching device.

In a preferred embodiment, the extrusion molded article of the presence invention contains, on the outer surface (4) of the body portion, a cosmetic lip (10) extending from a part of the covering layer, and has a push-in portion (6) that is formed extending from a portion of the covering layer to one side of an inner surface (5) of the body portion, wherein the push-in portion (6) extends in an outward direction from an opening portion (7), formed by the inner surface (5) of the body portion, beyond an end portion (8) of the core (2) so that the push-in portion (6) can be pushed into the opening portion (7), and wherein the push-in portion (6) also has at least one holding skirt (9) extending from a FIG. 5 shows a state where the extrusion molded article of FIG. 2 is fitted in a flange part of a auto body panel. The push-in portion (6) is pushed into the opening portion (7).

According to another preferred embodiment, the article has at least one holding skirt (9) extending from a part of the covering layer at a side that is opposite to the side where the push-in portion is formed on the inner surface (5) of the body portion, as shown in FIG. 6.

FIG. 7 shows a state where the extrusion molded article of FIG. 6 is fitted in a flange part of a auto body panel. The push-in portion (6) is pushed into the opening portion (7) so that the flange is inserted into the gap A. On account of the push-in portion, the gap A can be minimized, compared to the molded article having no push-in portion as shown in FIG. 1. As a result, the car body flange can be pressed and fixed more securely.

Next, a method of manufacturing the extrusion molded product of the present invention will be explained with reference to FIG. 8.

FIG. 8 is a schematic diagram showing a method for manufacturing the extrusion molded article of the present invention. First, a resin for the core (2) is fed into a first extruder (EX1) and passed through the inside of a first molding die (K1) to form a core. The core formed with a U-shaped cross-section is passed through a cooling tank (C1) and then, if desired, a cut section is formed using a puncher (P1). The extrusion molding of the core (2) is carried out with a die temperature of from 210 to 260° C. and a gradient of the melting temperature in the extrude of from 180° C. to 260° C.

Next, the core (2) obtained is inserted into a second mold die (K2). The resin composition to constitute the covering layer (3) is fed into the second mold die (K2) through a second extruder (EX2), while the resin composition to constitute the hollow sealing portion (11) is fed into the second mold die (K2) through a third extruder (EX3), to thereby integrally form the body portion (1) and the hollow sealing portion (11). The extrusion molding for the covering layer (3) is performed with a die temperature of from 180° C. to 230° C. and a melting temperature gradation in the extruder ranging from 150° C. to 230° C. The extrusion molding for the hollow sealing portion (11) is performed with a die temperature of from 180° C. to 230° C. and a melting temperature gradation in the extruder ranging from 150° C. to 230° C.

The molded article of the present invention the may have a thermoplastic resin composition layer having a sliding function (hereinafter, referred to as a sliding layer), on a part or the whole of the outer surface of the body portion (1) and of the hollow sealing portion (11). FIG. 9 shows a cross-sectional view of an example of the molded article of the present invention having a sliding layer (14). The sliding layer improves anti-abrasiveness, chemical resistance, and oil-proofing. A thermoplastic resin composition having the sliding function may be a styrene resin or olefin resin or their mixture having a friction resistance of 0.4 or less and hardness HDD (JIS K6253, value after 5 seconds) of from 40 to 60. In order to satisfy both of the sliding ability and the R-tracking ability, a mixture of highly crystalline olefin resin (PP, super high molecular weight PE and the like) with a styrene resin or an olefin resin is preferably used.

The aforementioned thermoplastic resin composition having the sliding function preferably has a tensile elongation at break (JIS K6251) of 300% or greater, more preferably from 300% to 1000%, from the aspect of the R-tracking ability.

If the sliding layer is provided, it may be provided by co-extrusion simultaneously with the integral molding of the body portion and the hollow sealing portion. Alternatively, the body portion and the hollow sealing portion are integrally formed, and then a molten resin composition having a sliding function is sprayed thereon. A thickness of the aforementioned sliding layer ranges preferably from 10 to 300 µm. If it exceeds 300 µm, the molded article tends to cause whitening when bended along the corner portion of the flange.

Furthermore, if desired, a layer of a styrene resin (styrene elastomer) with a hardness HDA (JIS K6253, value after 15 seconds) of from 10 to 30 can be provided between the outer side of the body portion and hollow sealing portion and the sliding layer in order to improve the appearance of the molded article. As an example of the aforementioned styrene resin, Riken Actimer LQA 9120S (ex Riken Technos Co., Ltd., Hardness HDA 20) may be used. The aforementioned layer can be provided by co-extrusion simultaneously with the integral molding of the body portion and the hollow sealing portion.

EXAMPLES

This invention will be explained below with reference to Embodiments and Comparison Examples. However, the present invention shall not be limited by these embodiments. The materials used in the embodiments and comparative examples and test methods are described below.

Materials

Component (a):
EPDM NODEL IP4770R (trade name, ex DuPont-Dow Elastomer Co. Ltd.)
Ethylene-propylene-5-ethylidene-2-norbornen (ENB) copolymer rubber synthesized with a metallocene catalyst, specific gravity: 0.88, Mooney viscosity $ML_{1+4}$ (125° C.): 70, weight average molecular weight: 200,000, ethylene 70%, ENB 4.9%

Component (b):
SPEEPS: SEPS4077 (trade name, ex Kuraray Co., Ltd.) Styrene-ethylene/ethylene/propylene-styrene copolymer, molecular weight: 270,000, styrene content: 30%
SEBS: Crayton MD6933ES (trade name, ex Crayton Polymer Co., Ltd.) Styrene-ethylene/butene-styrene copolymer, molecular weight: 270,000

Component (c):
PP: BC8 (trade name, ex Nippon Polychem Co., Ltd.), polypropylene, MFR (230° C., 2.16 kg): 2

Component (d):
Paraffin oil: PW-90 (trade name, ex Idemitsu Kosan Co., Ltd.) n-paraffin oil, weight average molecular weight: 540, dynamic viscosity at 40° C.: 95.54 cSt, dynamic viscosity at 100° C. 11.25 cSt, flow point: −15° C. flash point (COC): 270° C.

Component (e):
Phenol resin: Tackirol 201 (trade name, ex Taoka Chemical Industries Co., Ltd.) Alkylphenol formaldehyde resin Component (f):
Zinc oxide: zinc oxide (ex Sakai Chemical Co., Ltd.)

Other Components:
Antioxidant: IR1010 (trade name, ex Chiba Specialty Chemicals Co., Ltd.), phenolic antioxidant
Photo stabilizer [HALS]: TINUVIN P (trade name, ex Chiba Specialty Chemicals Co., Ltd.), hindered amine photo stabilizer
Calcium carbonate: NS-400 (trade name, ex Nitto Funka Kogyo)

Test Methods:
(1) Specific Gravity: measured with a 1 mm-thick press sheet as a specimen in accordance with JIS K 7112.
(2) Hardness A: measured with a 6 mm-thick press sheet as a specimen in accordance with JIS K6253 (HAD 15-second value).
(3) Tensile strength (MPa): measured at 23° C. in accordance with JIS K625. A 1 mm-thick press sheet was punched into a No. 3 dumbbell-shaped specimen. The tensile speed was 500 mm/min.
(4) 100% Modulus (MPa): measured in accordance with JIS K6251. A 1 mm-thick press sheet was punched into a No. 3 dumbbell-shaped specimen. The tensile rate was 500 mm/min. At 23° C. and 80° C.
(5) Tensile elongation at break (%):measured in accordance with JIS K 6251. A 1 mm-thick press sheet was punched into a No. 3 dumbbell-shaped specimen. The tensile speed was 500 mm/min. At 23° C. only for the core material, a 1 mm-thick press sheet was punched into a No. 1 dumbbell-shape in accordance with JIS K71161 (tensile speed: 5 mm/min.; at 23° C.).
(6) Elastic modulus (MPa): measured in accordance with ASSTM D790. A resin composition was injection molded at a resin temperature of 250° C. and a mold temperature of 40° C. into a specimen with a length of 127 mm, width of 13 mm and a thickness of 6.4 mm. A bending speed was 2.8 mm/min and the measurement was carried out at 23° C. and 80° C.
(7) Flange-holding force (N/100 mm): A coated plated with a length of 100 mm and a thickness of 3 mm was inserted in the molded article in the longitudinal direction over 100 mm and a load was measured when pulling the coated plated out at a pulling speed of 500 mm/min.
(8) compression set (%): measured in accordance with JIS K6262. A columnar specimen with a diameter of 13 mm and a thickness of 6.3 mm obtained by press molding was used as a specimen. The test conditions were compression ratio: 25%, and 70° C.×200 hours.
(9) MFT: measured in accordance with JIS 7210, under the conditions: temperature: 230° C., load: 2.16 kg.
(11) Appearance of the molded article: visually examined and evaluated based on the following criteria:

G: the surface is smooth,
M: the surface is a little rough.
B: the surface is very rough.
(12) Flange-holding ability: The flange-holding force measured in Item (7) above was evaluated in accordance with the following criteria.
G: The values measured at 23° C. and 80° C. were both at least 33 N/100 mm.
M: At least one of the values was at least 25 N/100 mm and less than 33 N/100 mm.
B: At least one of the values was less than 25 N/100 mm.
(13) R-tracking ability: The molded article was inserted into a flange with a thickness of 3 mm and R30, and was observed to see
    whether the body portion does not raise from the flange,
    whether there is any unnatural deformation such as a dent in the hollow sealing portion, and
    whether there is any damage (tears) On the body portion and hollow seal portion.

The results were evaluated based on the following criteria:
G: Body portion: no rising, nor damage.
    Hollow sealing portion: no deformation, nor damage
M: Body portion: gradually rising, or slight damage.
    Hollow sealing portion: slight deformation or slight damage.
B: Body portion: immediately rising, or conspicuously damaged.
    Hollow sealing portion: conspicuously deformed, or conspicuously damaged.
(14) Bleeding: the molded article was left standing at 80° C. for 500 hours, and then the surface was observed visually.
G: No bleeding, no tackiness
M: Slightly tacky
B: Severe tackiness
(15) Sealing ability: The value of the compression set measured under Item (8) was evaluated based on the following criteria:
G: The value was 35% or less
M: The value was greater than 35%, but not more than 45%
B: The value was greater than 45%.

Examples 1 through 10 and Comparative Examples 1 though 8

An extrusion molded article having a cross-section shown in FIG. 6 was manufactured using the compositions having the formulations (parts by weight) shown in Table 1 for the covering layer (3) and using the compositions having the formulations (parts by weight) shown in Table 2 for the hollow sealing portion (11). For the core (2), use was made of ESP 9840N (ex Riken Technos, polypropylene containing 40 wt % of talc powder, tensile elongation at break according to JIS K7161: 110%, elastic modulus at 23° C. according to ASTM D790: 3500 MPa).

A molding product was prepared according to the method shown in FIG. 8. Initially, the resin to constitute a core (2) was fed into a first extruder (EX1) and made to pass through the interior of a first mold die (K1) to form a core. The core formed with a U-shaped-cross section is passed through a cooling tank (C1) and then cut by a puncher (P1) to form a cut section. The extrusion molding of the core (2) was carried out with a die temperature of from 210 to 260° C. and a melting temperature gradient in the extruder ranging from 180° C. to 260° C. Next, the core (2) obtained was inserted into a second mold die (K2). The resin composition to constitute the covering layer (3) was fed into the second mold die (K2) through a second extruder (EX2), while the resin composition to constitute the hollow sealing portion (11) was fed into the second mold die (K2) through a third extruder (EX3), to thereby integrally form the body portion (1) and the hollow sealing portion (11). The extrusion molding for the covering layer (3) was performed with a die temperature of from 180° C. to 230° C. and a melting temperature gradation in the extruder ranging from 150° C. to 230° C. The extrusion molding for the hollow sealing portion (11) was performed with a die temperature of from 180° C. to 230° C. and a melting temperature gradation in the extruder ranging from 150° C. to 230° C.

Physical properties of each of the thermoplastic elastomer compositions and the assessment results of the molded articles are as seen in Tables 1 and 2.

TABLE 1

| | | (Covering layer) | | | | | | | | | |
|---|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Ex. 9 | Ex. 10 |
| Composition | (a) EPDM | 65.0 | 65.0 | 65.0 | 65.0 | 65.0 | 65.0 | 65.0 | 65.0 | 80.0 | 40.0 |
| | (b) SEEPS | 35.0 | 35.0 | 35.0 | 35.0 | 35.0 | 35.0 | 35.0 | 0.0 | 20.0 | 60.0 |
| | (b) SEBS | 0.0 | 0.0 | 0.0 | 0.0 | 0.0 | 0.0 | 0.0 | 35.0 | 0.0 | 0.0 |
| | (c) PP | 40.0 | 40.0 | 40.0 | 27.5 | 55.0 | 40.0 | 40.0 | 40.0 | 40.0 | 40.0 |
| | (d) Paraffin oil | 150.0 | 150.0 | 150.0 | 150.0 | 150.0 | 100.0 | 200.0 | 150.0 | 150.0 | 150.0 |
| | (e) Phenol resin | 5.0 | 2.5 | 11.0 | 5.0 | 5.0 | 5.0 | 5.0 | 5.0 | 5.0 | 5.0 |
| | (f) zinc oxide | 2.0 | 2.0 | 2.0 | 2.0 | 2.0 | 2.0 | 2.0 | 2.0 | 2.0 | 2.0 |
| | Antioxidant | 0.2 | 0.2 | 0.2 | 0.2 | 0.2 | 0.2 | 0.2 | 0.2 | 0.2 | 0.2 |
| | HALS | 0.2 | 0.2 | 0.2 | 0.2 | 0.2 | 0.2 | 0.2 | 0.2 | 0.2 | 0.2 |
| | Calcium carbonate | 25.0 | 25.0 | 25.0 | 25.0 | 25.0 | 25.0 | 25.0 | 25.0 | 25.0 | 25.0 |
| Assessment Results | Specific gravity | 0.96 | 0.96 | 0.96 | 0.96 | 0.96 | 0.96 | 0.96 | 0.96 | 0.96 | 0.96 |
| | Hardness A (23° C., 0 second value) | 52 | 51 | 52 | 41 | 66 | 64 | 40 | 51 | 52 | 51 |
| | Tensile strength* | 6.7 | 8 | 5 | 5 | 9.5 | 5.8 | 5 | 6.3 | 4.8 | 9 |
| | 100% modulus* (23° C.) | 1.8 | 1.5 | 2 | 1.3 | 2.3 | 2 | 1.3 | 1.8 | 1.6 | 1.6 |
| | 100% modulus* (80° C.) | 1.3 | 0.9 | 1.4 | 0.8 | 1.5 | 1.5 | 0.8 | 1.3 | 1 | 1 |
| | Modulus change (%) | 27.8 | 40.0 | 30.0 | 38.5 | 34.8 | 25.0 | 38.5 | 27.8 | 37.5 | 37.5 |
| | Tensile E. at break (%) | 500 | 660 | 350 | 350 | 520 | 350 | 500 | 500 | 370 | 680 |

TABLE 1-continued (Covering layer)

|  |  |  |  |  |  |  |  |  |  |  |
|---|---|---|---|---|---|---|---|---|---|---|
|  | Flange-holding force (23° C.)(N/100 mm) | 69 | 64 | 69 | 49 | 75 | 74 | 50 | 68 | 66 | 70 |
|  | Flange-holding force (80° C.)(N/100 mm) | 35 | 26 | 34 | 26 | 38 | 37 | 27 | 35 | 30 | 27 |
|  | MFR (10 kg, 230° C.) | 15 | 30 | 4 | 3 | 22 | 7 | 20 | 19 | 18 | 3 |
|  | Appearance | G | G | M | M | G | M | G | G | M | G |
|  | Flange-holding ability | G | M | G | M | G | G | M | G | M | M |
|  | R-tracking | G | G | M | M | M | M | G | G | M | G |
|  | Bleeding | G | G | G | G | G | G | M | G | M | G |

|  |  | Comp. 1 | Comp. 2 | Comp. 3 | Comp. 4 | Comp. 5 | Comp. 6 | Comp. 7 | Comp. 8 |
|---|---|---|---|---|---|---|---|---|---|
| Composition | (a) EPDM | 65.0 | 65.0 | 65.0 | 65.0 | 65.0 | 65.0 | 90.0 | 20.0 |
|  | (b) SEEPS | 35.0 | 35.0 | 35.0 | 35.0 | 35.0 | 35.0 | 10.0 | 80.0 |
|  | (b) SEBS | 0.0 | 0.0 | 0.0 | 0.0 | 0.0 | 0.0 | 0.0 | 0.0 |
|  | (c) PP | 40.0 | 40.0 | 17.5 | 65.0 | 40.0 | 40.0 | 40.0 | 40.0 |
|  | (d) Paraffin oil | 150.0 | 150.0 | 150.0 | 150.0 | 75.0 | 220.0 | 150.0 | 150.0 |
|  | (e) Phenol resin | 1.0 | 13.5 | 5.0 | 5.0 | 5.0 | 5.0 | 5.0 | 5.0 |
|  | (f) Zinc oxide | 2.0 | 2.0 | 2.0 | 2.0 | 2.0 | 2.0 | 2.0 | 2.0 |
|  | Antioxidant | 0.2 | 0.2 | 0.2 | 0.2 | 0.2 | 0.2 | 0.2 | 0.2 |
|  | HALS | 0.2 | 0.2 | 0.2 | 0.2 | 0.2 | 0.2 | 0.2 | 0.2 |
|  | Calcium carbonate | 25.0 | 25.0 | 25.0 | 25.0 | 25.0 | 25.0 | 25.0 | 25.0 |
| Assessment Results | Specific gravity | 0.96 | 0.96 | 0.96 | 0.96 | 0.96 | 0.96 | 0.96 | 0.96 |
|  | Hardness A (23° C., 0 second value) | 51 | 52 | 34 | 71 | 66 | 34 | 52 | 51 |
|  | Tensile strength* | 10 | 3 | 3 | 12 | 5 | 4 | 3.5 | 10 |
|  | 100% modulus* (23° C.) | 1.4 | 2.1 | 0.8 | 3.1 | 2 | 0.8 | 1.9 | 1.6 |
|  | 100% modulus* (80° C.) | 0.6 | 1.5 | 0.4 | 1.5 | 1.5 | 0.4 | 1 | 0.6 |
|  | modulus change (%) | 57.1 | 28.6 | 50.0 | 51.6 | 25.0 | 50.0 | 47.4 | 62.5 |
|  | Tensile E. at break (%) | 780 | 180 | 300 | 530 | 280 | 600 | 300 | 780 |
|  | Flange-holding force (23° C.) (N/100 mm) | 57 | 64 | 35 | 75 | 74 | 38 | 65 | 70 |
|  | Flange-holding force (80° C.) (N/100 mm) | 20 | 34 | 18 | 31 | 37 | 20 | 27 | 20 |
|  | MFR (10 kg, 230° C.) | 25 | 1 | 1.5 | 27 | 1 | 20 | 22 | 9 |
|  | Appearance | G | B | B | G | B | G | M | G |
|  | Flange-holding ability | B | G | B | M | G | B | H | B |
|  | R-tracking | G | B | B | B | B | G | B | G |
|  | Bleeding | G | G | G | G | G | B | B | G |

*unit in Mpa

TABLE 2

(Hollow sealing portion)

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Composition | (a) EPDM | 60.0 | 60.0 | 60.0 | 60.0 | 60.0 | 60.0 | 60.0 | 60.0 | 80.0 | 40.0 |
|  | (b) SEEPS | 40.0 | 40.0 | 40.0 | 40.0 | 40.0 | 40.0 | 40.0 | 0.0 | 20.0 | 60.0 |
|  | (b) SEBS | 0.0 | 0.0 | 0.0 | 0.0 | 0.0 | 0.0 | 0.0 | 40.0 | 0.0 | 0.0 |
|  | (c) PP | 15.0 | 15.0 | 15.0 | 5.0 | 21.0 | 15.0 | 15.0 | 15.0 | 15.0 | 15.0 |
|  | (d) Paraffin oil | 174.0 | 174.0 | 174.0 | 174.0 | 174.0 | 132.0 | 204.0 | 174.0 | 174.0 | 174.0 |
|  | (e) Phenol resin | 5.0 | 2.0 | 12.0 | 5.0 | 5.0 | 5.0 | 5.0 | 5.0 | 5.0 | 5.0 |
|  | (f) Zinc oxide | 2.0 | 2.0 | 2.0 | 2.0 | 2.0 | 2.0 | 2.0 | 2.0 | 2.0 | 2.0 |
|  | Antioxidant | 0.2 | 0.2 | 0.2 | 0.2 | 0.2 | 0.2 | 0.2 | 0.2 | 0.2 | 0.2 |
|  | HALS | 0.2 | 0.2 | 0.2 | 0.2 | 0.2 | 0.2 | 0.2 | 0.2 | 0.2 | 0.2 |
|  | Calcium carbonate | 30.0 | 30.0 | 30.0 | 30.0 | 30.0 | 30.0 | 30.0 | 30.0 | 30.0 | 30.0 |
| Assessment Results | Specific gravity | 0.97 | 0.97 | 0.97 | 0.96 | 0.96 | 0.96 | 0.96 | 0.96 | 0.96 | 0.96 |
|  | Hardness A (23° C., 0 second value) | 25 | 24 | 26 | 18 | 35 | 35 | 18 | 25 | 25 | 25 |
|  | Tensile strength* | 4 | 5 | 3 | 3 | 6 | 5 | 3 | 4 | 3 | 4 |
|  | 100% modulus* (23° C.) | 0.6 | 0.4 | 0.8 | 0.4 | 1 | 1 | 0.4 | 0.6 | 0.6 | 0.6 |
|  | Tensile E. at break (%) | 450 | 600 | 260 | 260 | 500 | 370 | 510 | 470 | 290 | 560 |
|  | Compression set (%) (25% compression, 70° C. × 200 hr) | 23 | 32 | 21 | 21 | 33 | 29 | 20 | 24 | 30 | 33 |
|  | MFR (10 kg, 230° C.) | 4 | 15 | 2 | 2 | 8 | 2 | 5 | 4 | 6 | 4 |

TABLE 2-continued

|  |  | (Hollow sealing portion) |  |  |  |  |  |  |  |  |  |
|---|---|---|---|---|---|---|---|---|---|---|---|
|  | Appearance | G | G | M | M | G | M | G | M-G | M | M |
|  | Sealing ability | G | M | G | G | M | M | G | G | M | M |
|  | R-tracking | G | G | G | M | M | M | G | G | M | G |
|  | Bleeding | G | G | G | G | G | G | M | G | G | G |

|  |  | Comp. 1 | Comp. 2 | Comp. 3 | Comp. 4 | Comp. 5 | Comp. 6 | Comp. 7 | Comp. 8 |
|---|---|---|---|---|---|---|---|---|---|
| Composition | (a) EPOM | 60.0 | 60.0 | 60.0 | 60.0 | 60.0 | 60.0 | 90.0 | 20.0 |
|  | (b) SEEPS | 40.0 | 40.0 | 40.0 | 40.0 | 40.0 | 40.0 | 10.0 | 80.0 |
|  | (b) SEBS | 0.0 | 0.0 | 0.0 | 0.0 | 0.0 | 0.0 | 0.0 | 0.0 |
|  | (c) PP | 15.0 | 15.0 | 3.0 | 23.5 | 15.0 | 15.0 | 15.0 | 15.0 |
|  | (d) Paraffin oil | 174.0 | 174.0 | 174.0 | 174.0 | 99.0 | 225.0 | 174.0 | 174.0 |
|  | (e) Phenol resin | 1.0 | 12.5 | 5.0 | 5.0 | 5.0 | 5.0 | 5.0 | 5.0 |
|  | (f) Zinc oxide | 2.0 | 2.0 | 2.0 | 2.0 | 2.0 | 2.0 | 2.0 | 2.0 |
|  | Antioxidant | 0.2 | 0.2 | 0.2 | 0.2 | 0.2 | 0.2 | 0.2 | 0.2 |
|  | HALS | 0.2 | 0.2 | 0.2 | 0.2 | 0.2 | 0.2 | 0.2 | 0.2 |
|  | Calcium carbonate | 30.0 | 30.0 | 30.0 | 30.0 | 30.0 | 30.0 | 30.0 | 30.0 |
| Assessment Results | Specific gravity | 0.97 | 0.97 | 0.96 | 0.96 | 0.96 | 0.96 | 0.96 | 0.96 |
|  | Hardness A (23° C., 0 second value) | 24 | 26 | 17 | 38 | 44 | 13 | 25 | 25 |
|  | Tensile strength* | 4 | 3 | 2 | 5 | 5.5 | 1.5 | 3 | 3 |
|  | 100% modulus* (23° C.) | 0.4 | 0.85 | 0.2 | 1.1 | 1.2 | 0.3 | 0.6 | 0.6 |
|  | Tensile E. at break (%) | 640 | 200 | 210 | 500 | 210 | 560 | 220 | 620 |
|  | Compression set (%) (25% compression, 70° C. × 200 hr) | 38 | 20 | 20 | 36 | 36 | 36 | 37 | 40 |
|  | MFR (10 kg, 230° C.) | 15 | 2 | 2 | 8 | 0.5 | 5 | 4 | 0.7 |
|  | Appearance | G | B | B | G | B | G | M | B |
|  | Sealing ability | B | G | G | B | B | M | B | B |
|  | R-tracking | G | B | B | B | B | G | B | G |
|  | Bleeding | G | G | G | G | G | B | B | G |

As shown in Tables 1 and 2, the extrusion molded articles of the present invention showed no bleeding and had the excellent appearance as well as the excellent R-tracking ability. The body portion had the excellent flange-holding ability and the hollow sealing portion showed the excellent sealing ability. In contrast, in Comparative Examples 1 through 8 with the thermoplastic elastomer composition which did not have the physical properties specified by the present invention, the appearance and performance were insufficient, though integral molding by co-extrusion was possible.

Examples 11 through 13 and Comparative Examples 9 through 11

Molded articles were manufactured as in Example 1, except that the compositions shown in Table 3 were used for the core (2). Their flange-holding ability and R-tracking ability were evaluated, as shown in Table 3.

TABLE 3

|  |  | Ex. 11 | Ex. 12 | Ex. 13 | Comp. 9 | Comp. 10 | Comp. 11 |
|---|---|---|---|---|---|---|---|
| Composition (parts by weight) | Novatec EC9 (*1) | 60 | 70 | 50 |  |  |  |
|  | Novatec EA9 (*2) |  |  |  | 80 |  | 60 |
|  | Crown Talc (*3) | 40 | 30 | 50 | 20 | 60 | 40 |
| Assessment Results | Specific gravity | 1.23 | 1.13 | 1.33 | 1.04 | 1.39 | 1.23 |
|  | Elastic modulus (23° C.) (MPa) | 3500 | 2800 | 4200 | 2000 | 4600 | 4400 |
|  | Elastic modulus (80° C.) (MPa) | 1200 | 1000 | 1300 | 700 | 1500 | 1500 |
|  | Tensile elongation at break (%) | 110 | 140 | 80 | 160 | 60 | 30 |
|  | Flange-holding | G | M | G | B | G | G |
|  | R-tracking | G | G | M | G | B | B |

(*1) Polypropylene, ex Nippon Polypropylene Co., Ltd.
(*2) Polypropylene, ex Nippon Polypropylene Co., Ltd.
(*3) Talc with a mean particle size of 9 μm, ex Matsumura Sangyo, Co., Ltd.

As seen in Table 3, the molded articles in Examples 11 through 13 showed the excellent flange-holding ability and R-tracking ability, wherein a resin composition constituting the core (2) had an elastic modulus at 23° C. of 2500 MPa or greater and a tensile elongation at break of 80% or greater.

Example 14

As shown in FIG. 9, a thermoplastic resin composition layer having a sliding function (sliding layer) (14) with a thickness of 12 μm was applied on the outer surface of the extrusion molded article obtained in Example 1. As the aforementioned resin composition having the sliding function, LVR 9805N (trade name, ex Rheostomer, Riken Technos Co., Ltd, highly crystalline HDPE+rubber, tensile elongation at break (JIS K6251): 410%) was used. The sliding layer was prepared as follows. The aforementioned resin composition was supplied from a fourth extruder into the second die and extruded simultaneously with the molding of the covering layer and the hollow sealing portion. The extrusion molding of the sliding layer was performed with a gradation of the melting temperature in the extruder of from 160° C. to 240° C. The molded article obtained exhibited sufficient abrasive resistance, and no whitening when bended along the corner of the flange.

Examples 15 through 17

Molded articles were manufactured as in Example 14, except that the thickness of the sliding layer was changed to 50 μm (Example 15), 100 μm (Example 16), or 190 μm (Example 17). All of the molded articles exhibited sufficient abrasion resistance, and no whitening when bended along the corner of the flange.

The extrusion molded article of the present invention is useful as weather strips and opening trims for automobiles.

BRIEF EXPLANATION ON THE DRAWINGS

Figure 1:
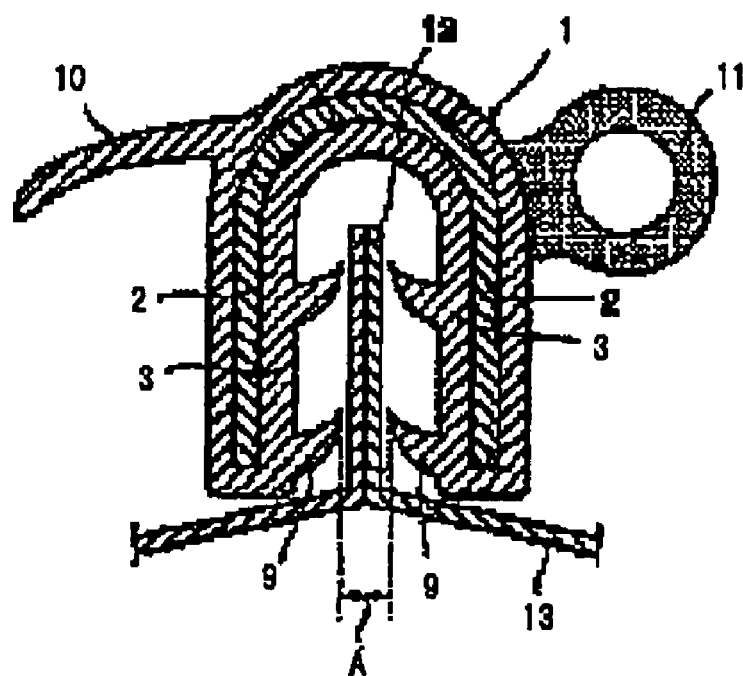
FIG. 1 is a cross-sectional view of an extrusion molded article of the present invention to which a flange part of a car body panel is fitted.
Figure 2:
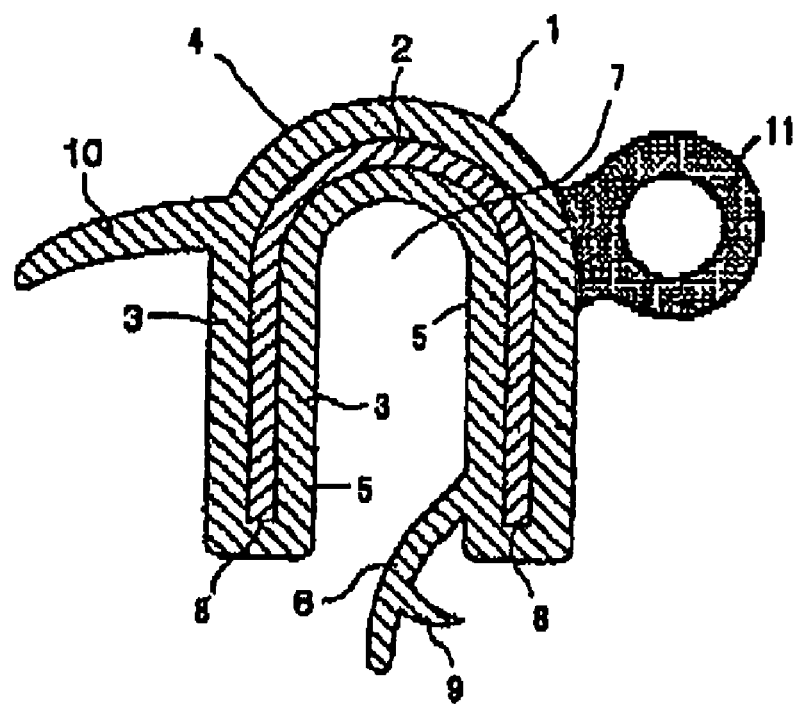
FIG. 2 is a cross-sectional view of another extrusion molded article of the present invention.
Figure 3:
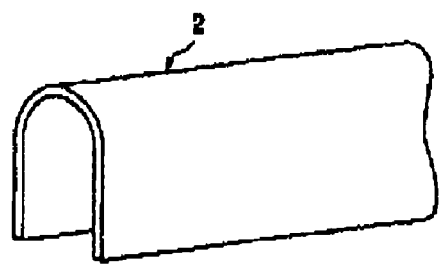
FIG. 3 is a perspective view of a core in an extrusion molded article of the present invention.
Figure 4:
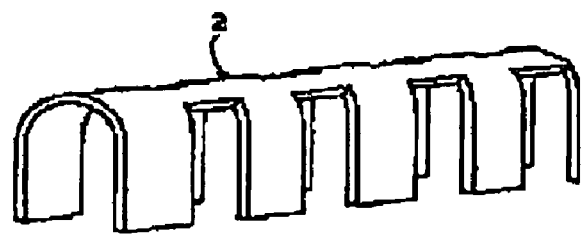
FIG. 4 is a perspective view of another core in an extrusion molded article of the present invention.
Figure 5:
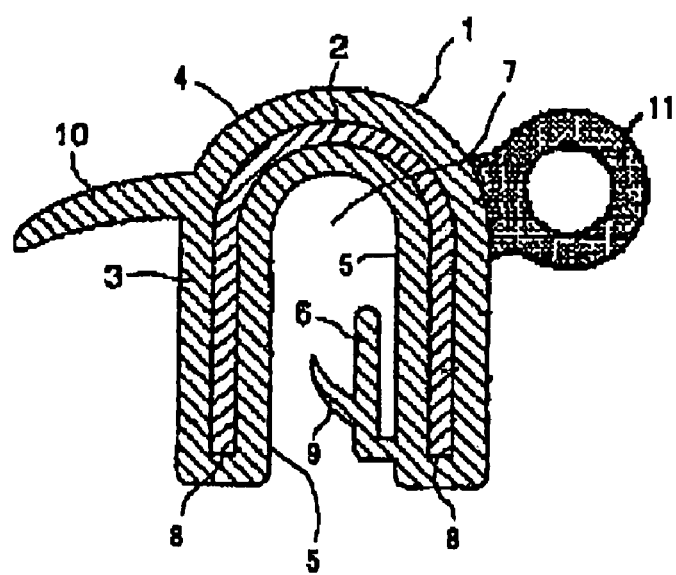
FIG. 5 is a cross-sectional view of the extrusion molded article shown in FIG. 2 in which when a push-in portion is pushed.
Figure 6:
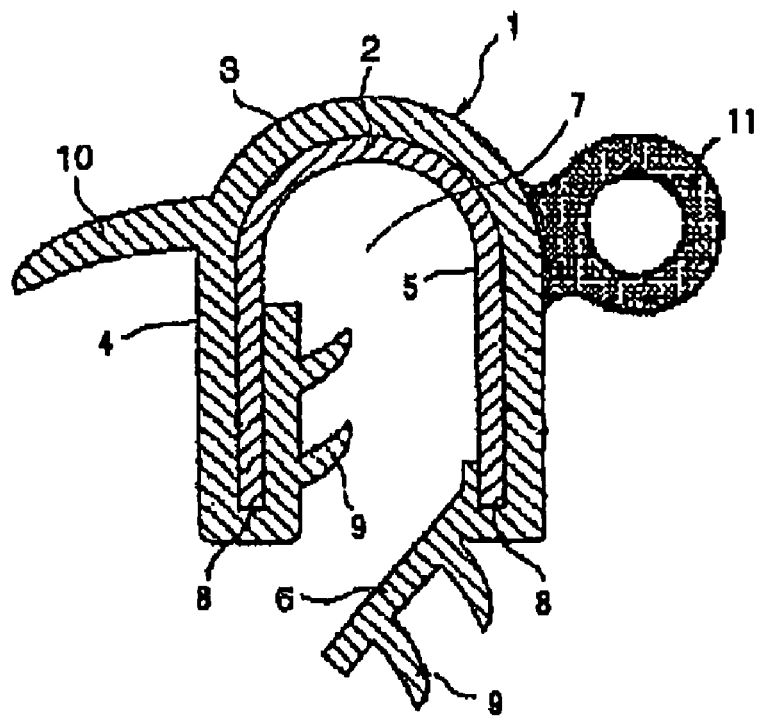
FIG. 6 is a cross-sectional view of another extrusion molded article of the present invention.
Figure 7:
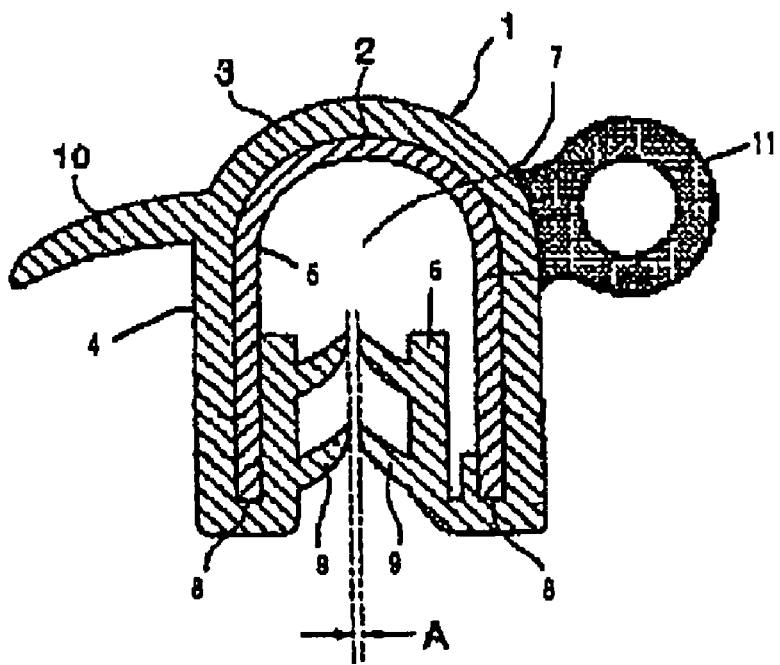
FIG. 7 is a cross-sectional view of the extrusion molded article shown in FIG. 6 in which when a push-in portion is pushed.
Figure 8:
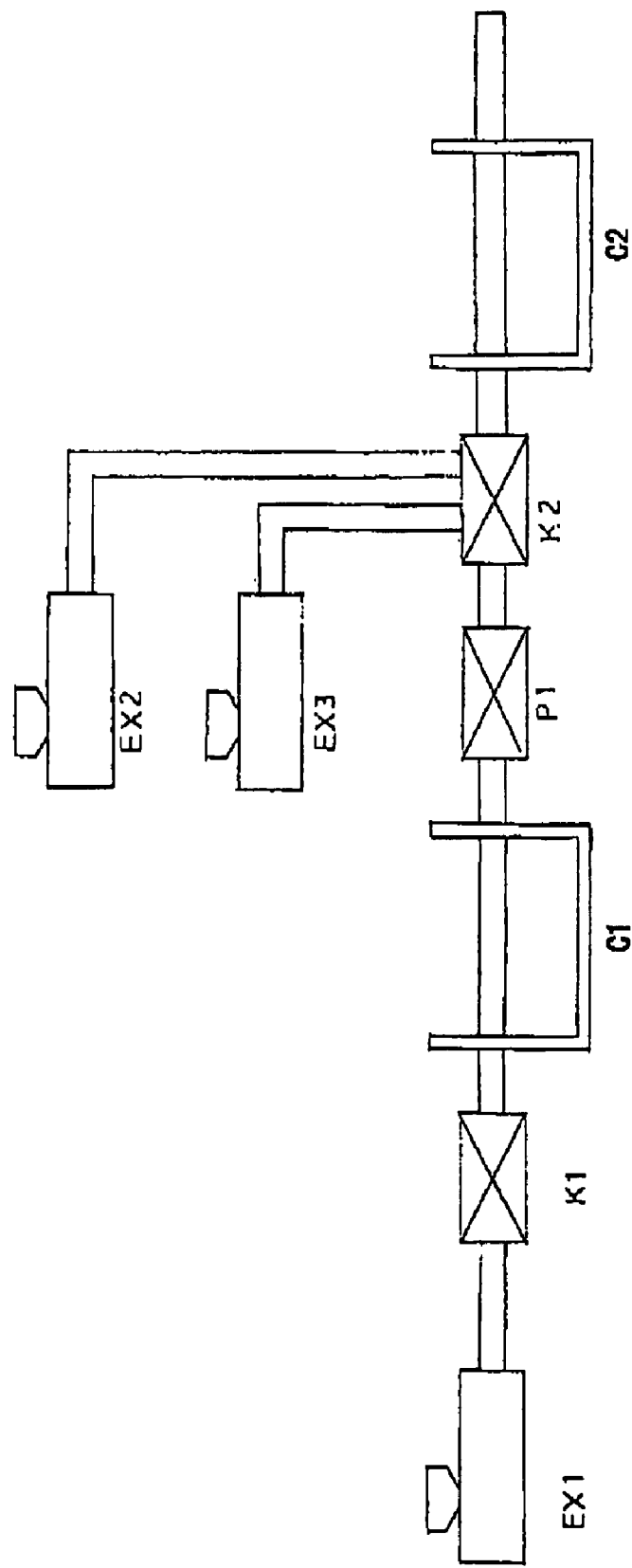
FIG. 8 is a schematic diagram showing a method of manufacturing an extrusion molded article of the present invention.
Figure 9:
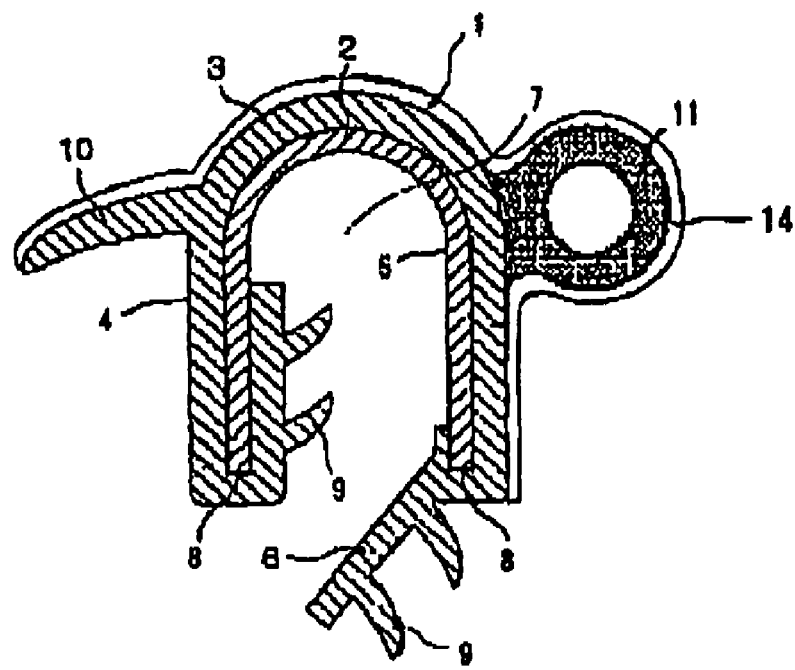
FIG. 9 is a cross-sectional view of another extrusion molded article of the present invention.
Figure 10:
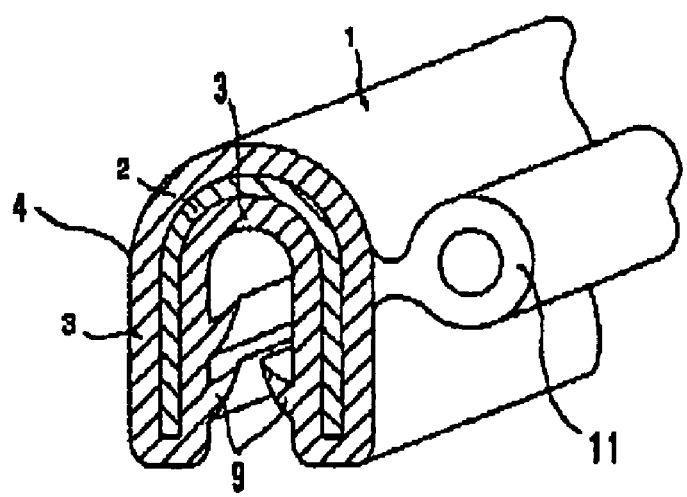
FIG. 10 is a perspective view of another extrusion molded article of the present invention.

| 1: | Body portion |
| 2: | Core |
| 3: | Covering layer |
| 4: | Outer surface |
| 5: | Inner surface |
| 6: | Push-in portion |
| 7: | Opening portion |
| 8: | End portion |
| 9: | Holding skirt |
| 10: | Cosmetic lip |
| 11: | Hollow sealing portion |
| 12: | Flange |
| 13: | Car body panel |
| 14: | Sliding layer |
| A: | Gap |
| EX 1: | First extruder |
| EX 2: | Second extruder |
| EX 3: | Third extruder |
| K 1: | First mold die |
| K 2: | Second mold die |
| P 1: | Puncher |
| C 1: | Cooling tank |
| C 2: | Cooling tank |

The invention claimed is:

1. An extrusion molded article for automobiles, having a body portion and a hollow sealing portion, where the body portion comprises a core made of a resin having a U-shaped cross-section extending in a longitudinal direction and a covering layer surrounding and covering the core partly or entirely, and the hollow sealing portion is bonded integrally with an outer surface of the body portion, characterized in that the covering layer is made of a thermoplastic elastomer composition having a tensile elongation at break of at least 350%, as determined according to the Japanese Industrial Standards (JIS) K6251, and a change in 100% modulus of at most 40%, wherein the change in 100% modulus=[(100% modulus at 23° C.-100% modulus at 80° C.)/100% modulus at 23° C.]× 100, and the 100% modulus is a stress at 100% elongation, as determined according to JIS K6251, the hollow sealing portion is made of a thermoplastic elastomer composition having a tensile elongation at break of at least 250%, as determined according to JIS K6251, and a compression set of 35% or less, as determined at 25% compression, 70° C., 200 hours, the thermoplastic elastomer composition forming the covering layer comprises a crystalline olefin resin in an amount of 27.5 to 63 parts by weight of the composition, and the thermoplastic elastomer composition forming the hollow sealing portion comprises a crystalline olefin resin in an amount of 4 to 22 parts by weight of the composition.

2. The extrusion molded article as described in claim 1, wherein the article has a push-in portion that is formed extending from a portion of the covering layer to one side of an inner surface of the body portion, wherein the push-in portion extends in an outward direction from an opening portion, formed by the inner surface of the body portion, beyond an end portion of the core so that the push-in portion can be pushed into the opening portion, and wherein the push-in portion also has at least one holding skirt extending from a part of the push-in portion.

3. The extrusion molded article as described in claim 2, wherein the article has at least one holding skirt extending from a part of the covering layer at a side that is opposite to the side where the push-in portion is formed on the inner surface of the body portion.

4. The extrusion molded article as described in claim 1, wherein the article has a thermoplastic resin composition layer having a sliding function, on a part or the whole of the outer surface of the body portion and of the hollow sealing portion.

5. The extrusion molded article as described in claim 4, wherein the thermoplastic resin composition having a sliding function has a tensile elongation at break of 300% or greater, as determined according to JIS K6251.

6. The extrusion molded article as described in claim 1, wherein the core is made of a resin composition having a tensile elongation at break of 80% or greater, as determined according to JIS K7161, and a elastic modulus at 23° C. of 2500 MPA or greater, as determined according to ASTM D790, wherein the resin composition is selected from the group consisting of olefin resins, styrene resins, and mixtures thereof with talc, mica or glass fiber powder.

* * * * *